ate the piston 17 in the air cylinder 16.

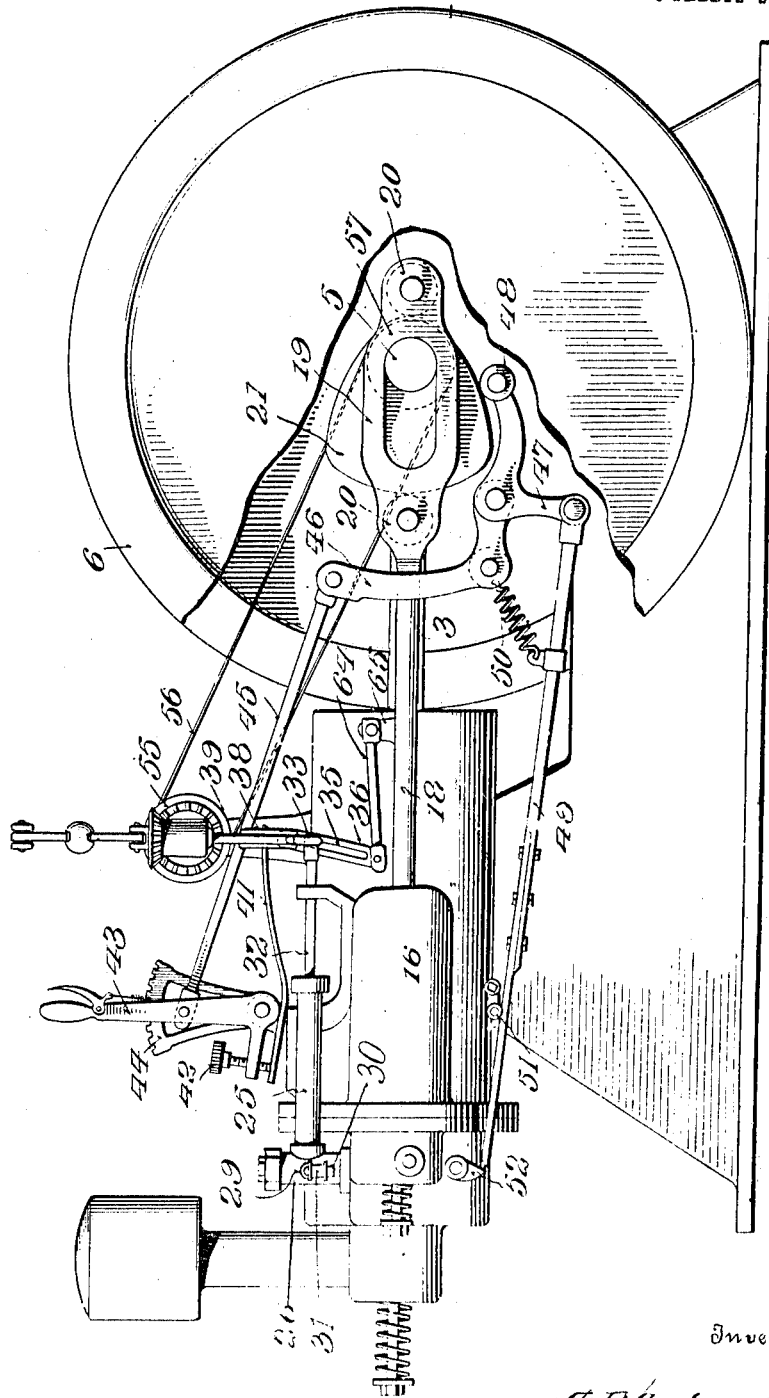

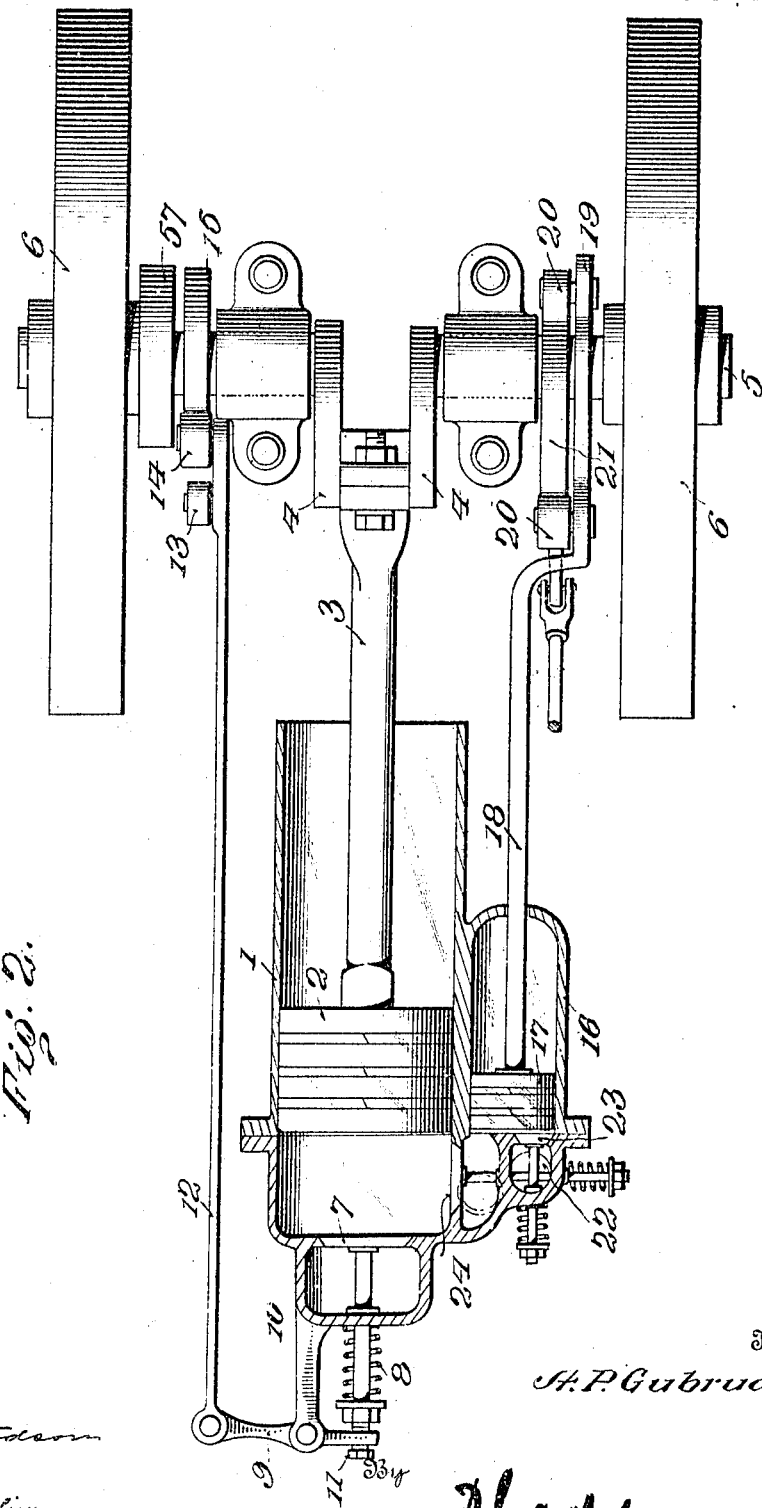

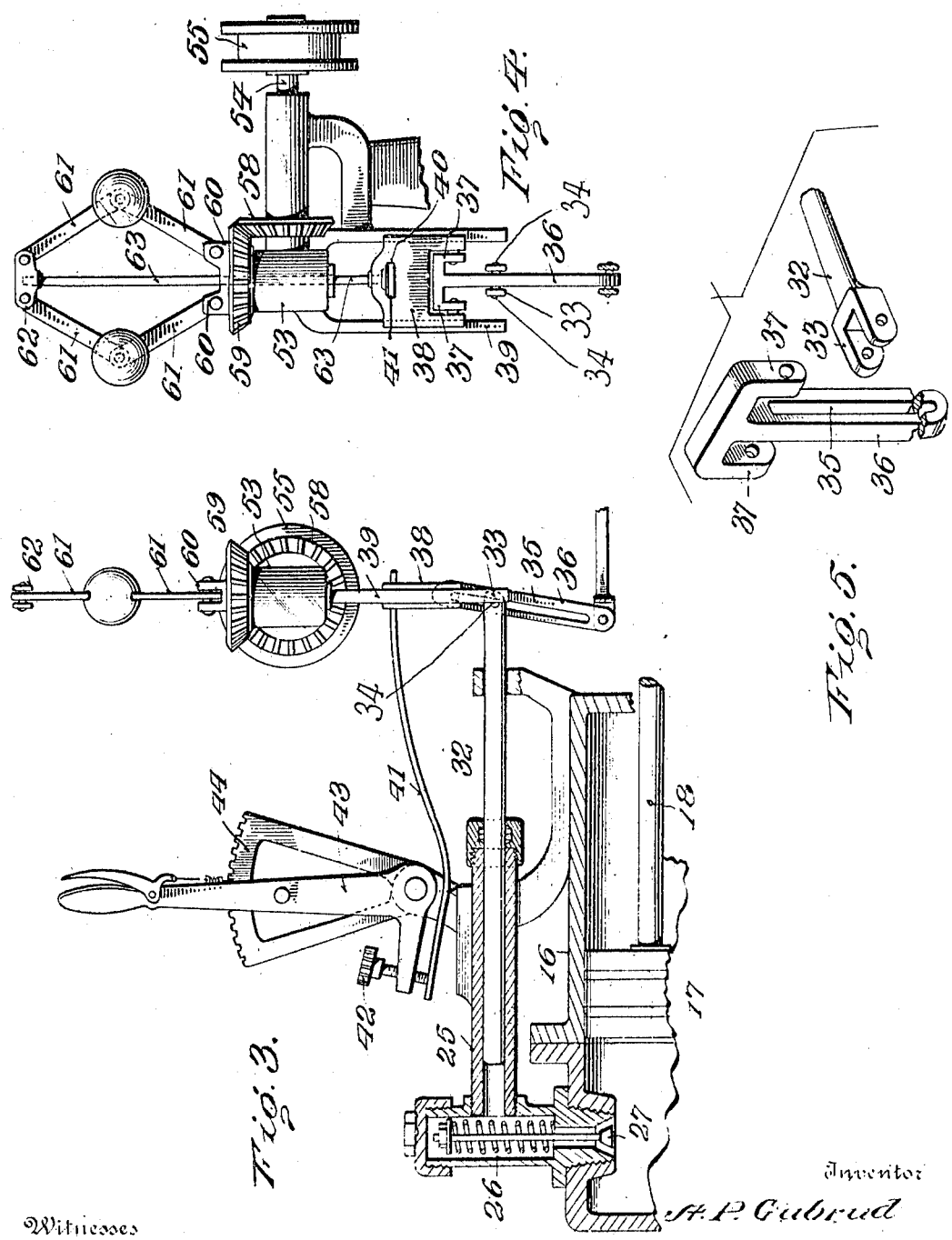

UNITED STATES PATENT OFFICE.

ADOLPH P. GUBRUD, OF HUDSON, SOUTH DAKOTA.

AUTOMATIC MIXER AND CHARGER FOR GAS-ENGINES.

992,958.

Specification of Letters Patent.   Patented May 23, 1911.

Application filed January 19, 1910.   Serial No. 538,858.

*To all whom it may concern:*

Be it known that I, ADOLPH P. GUBRUD, citizen of the United States, residing at Hudson, in the county of Lincoln and State of South Dakota, have invented certain new and useful Improvements in Automatic Mixers and Chargers for Gas-Engines, of which the following is a specification.

This invention comprehends certain new and useful improvements in internal combustion engines, and relates particularly to charge forming devices therefor.

The invention has for its primary object an improved automatic mixing and charging device or mechanism, which, when attached to or incorporated in an ordinary internal combustion or explosive engine, will increase the kinetic energy and thermal efficiency of the engine and effect an explosion of a charge in each cylinder employed, for every revolution of the fly wheel shaft. And the invention also has for its object an improved construction and arrangement of air and liquid fuel pumps, together with governor mechanism, whereby the engine may be easily kept under control at all times and expend its gaseous fuel according to the load imposed on the drive shaft.

With these and other objects in view as will more fully appear as the description proceeds, the invention consists in certain constructions, arrangements and combinations of the parts that I shall hereinafter fully described and claim.

For a full understanding of the invention, reference is to be had to the following description and accompanying drawings, in which:

Figure 1 is a side elevation of one form or embodiment of my invention: Fig. 2 is a partial horizontal section and partial top plan view thereof; Fig. 3 is a longitudinal sectional view of a portion of the engine; Fig. 4 is a transverse sectional view of a governor mechanism: Fig. 5 illustrates in perspective two parts of means for actuating the piston of the liquid fuel pump.

Corresponding and like parts are referred to in the following description and indicated in all the views of the drawings by the same reference characters.

Referring to the drawings, the numeral 1 designates a gas engine working cylinder which in the present instance is shown as horizontally disposed and supported upon any adjustable bed or casing.

2 designates the power piston which is mounted for reciprocation in the cylinder 1, and 3 designates the ordinary pitman which connects the piston 2 to the crank 4 of the drive shaft 5, said shaft carrying fly wheels 6.

The cylinder 1 is provided at one end with an exhaust port controlled by an inwardly opening valve 7, the stem of said valve projecting outwardly, as shown, and being encircled by a valve closing spring 8. A rocker 9 is fulcrumed intermediate of its ends on a bar 10 which projects outwardly from one end of the cylinder 1, said rocker carrying at one end a set screw 11 designed to strike the outer end of the stem of the valve 7 when the rocker is moved in one direction, whereby to open the valve against the tension of the spring 8. The other end of the rocker 9 is connected to a rod 12 which extends longitudinally along one side of the cylinder 1 toward the crank shaft 5, the rod 12 being connected near one end to a vertically disposed supporting lever 13 which holds it in such position that its roller 14 may be engaged by a cam 15 formed on the crank shaft.

All of the above-named parts may be of any desired construction, design or type, and are here disclosed for the purpose of illustration only.

In carrying out my invention, I secure to the cylinder 1 or mount upon the bed or casing of the engine in any desired way, an air pump cylinder 16 which in the present embodiment of the invention extends longitudinally of the main or working cylinder 1 and which contains a piston or follower head 17 connected to one end of a piston rod 18. This rod works through one end of the cylinder 16 and is extended toward the crank shaft 5, where the said rod is provided with a strap 19 mounted upon the shaft 5 and with rollers 20 designed to be engaged by a cam 21 formed on or secured to the said crank shaft, whereby to reciprocate the piston 17 in the air cylinder 16. At its opposite end the cylinder 16 is formed with an air inlet opening 22 designed to be secured to an air inlet pipe (not shown) the opening 22 communicating with the main interior of the cylinder 16 and said communication being controlled by an inwardly opening and outwardly spring pressed check valve 23. The interior of the cylinder 16 also communicates with the front end of the main or working cylinder 1, such last named communication being controlled by an inwardly opening and outwardly spring pressed check valve 24.

Mounted upon the air cylinder 16 is a liquid fuel or gasolene pump, the casing of which is designated 25. This casing or barrel 25 is connected at one end to a vertically disposed valve casing 26 formed at its lower end for attachment in an opening formed in the top of the charge forming chamber of the cylinder 16. A check valve 27 is mounted in the casing 26 and opens, against the tension of its spring, toward the interior of the cylinder 16, so that as the piston rod 32 of the barrel 25 moves toward the check valve, the same will open and allow a charge of hydrocarbon fuel to be injected into the charge forming chamber of the cylinder 16 to mix with the air that has been aspirated into said chamber by the rearward movement of the piston 17. The return movement of the piston rod 32 will permit the valve 27 to close and at the same time draw fresh fuel into the casing 26 through an inlet opening 29 and from a fuel supply pipe 30 which is connected thereto and which is provided with an inwardly opening check valve, as indicated at 31.

The piston rod is provided at its rear end with a fork 33 through which a transversely extending pin 34 extends, said pin being mounted for a free longitudinal movement in a slot 35 which is formed in the shank portion of a T-shaped link 36. The outwardly extending and returned ends 37 of this link 36 are mounted to rock in a cross head 38 which is mounted for a longitudinally sliding movement in a relatively stationary frame 39 forming part of a casting which supports other portions of the governor mechanism. The cross head 38 is formed with an opening 40 extending therethrough, and a spring 41 has one end loosely inserted in the opening 40, the other end of said spring being pressed upon by a regulating screw 42 which is carried in one arm of a bell crank hand lever 43. This lever is fulcrumed on some stationary part of the casing and is provided with a detent designed for engagement with a segment or quadrant 44. By shifting the lever 43, the pressure of the spring 41 on the cross head 38 may be varied and the tension of the governor, to be now hereinafter described, may be adjusted, while in addition to this function, the said hand lever is arranged to control the sparking device, that is, the advancement or retardation of the spark, through the instrumentality of the following elements: A link rod 45 is connected at one end to the hand lever 43 and is connected at its opposite end, near the crank shaft 5, to one arm of a bell crank 46. This bell crank is fulcrumed at its elbow on some stationary portion of the engine bed or casing, and the other arm of said bell crank is connected to a bell crank 47, the last named bell crank carrying the roller 48 designed for engagement by the cam 21. A spark rod 49 is pivotally connected to one arm of the bell crank 47 and is supported in a downwardly yielding manner by means of a compression spring 50 which is connected to the bell crank 46 and to the said spark rod 49. The tension of the spring 50 is exerted in a direction to pull the forward free end of the spark rod 49 in an upward direction, and against a regulating roller 51 which is vertically adjusted, as shown, so that the position (vertically considered) of the spark rod may be varied, as the rod is reciprocated back and forth to wipe against the contact rocker 52 to ignite the charge. Manifestly, by shifting the hand lever 43 in one direction or the other, the rod 45 will be moved in a direction to advance or retard the point at which the cam 21 will contact with the roller 48 to actuate the spring rod 49. In this way the spark is advanced or retarded.

Coming now to the further description of the governing mechanism, before mentioned, it will be noted particularly by reference to Fig. 4 that the guide 39 forms part of the casting 53 in which a transversely extending shaft 54 is mounted for rotation about its longitudinal axis. This shaft carries at one end a pulley or band wheel 55 and a belt or band 56 extends over said wheel 55 and over a corresponding wheel 57 mounted on the crank shaft 5. The shaft 54 carries at its inner end a bevel pinion 58 which meshes with a corresponding pinion 59. Fast to the pinion 59 are ears 60 to which the inner ends of weighted toggle links 61 are pivotally connected. The outer ends of these toggle links 61 are connected to a head 62 from which a stem 63 works inwardly. The inner end of this stem 63 is connected to the cross head 38. It will thus be understood that as the stem 63 is drawn out or in by the weighted toggle links 61, governed by the speed of the crank shaft 5 and the load imposed thereon, the cross head 38 will be moved in one direction or the other, and by carrying the rocker link 36 with it, will shorten or lengthen the stroke of the rod 32 and consequently control the output of the pump for the liquid fuel. The movement of the link 36 is effected by a rod 64 which is pivotally connected to the lower end of the link and which is also connected to a projection 65 formed on the piston rod 18.

From the foregoing description in connection with the accompanying drawings, the practical operation of my improved internal combustion engine will be apparent. As the piston 17 is moving in its rearward traverse, it will aspirate a charge of air into the cylinder 16, while at the same time the rearward movement of the rod 64 will draw the piston rod 32 rearwardly in the barrel 25 and suck into the barrel an amount of liquid fuel, proportionate to the position of the cross head 38 and the consequent position of the link 36 controlled by the governor as above set forth. Upon the forward movement of the piston 17, the piston rod 32 will also be moved forwardly and force a charge of liquid fuel into the air in the cylinder 16, the air and liquid fuel being thereby effectually commingled and forced into the forward end of the main working cylinder 31 just after the spent charge has been vented and just as the power piston 2 starts its backward stroke.

Having thus described the invention, what is claimed as new is:

1. In an internal combustion engine in combination with the working cylinder thereof, a fuel pump adapted to pump fuel into the working cylinder, an air pump adapted to force air into said cylinder, the air pump including a piston rod, the fuel pump also including a piston rod, an operative connection between the two piston rods whereby one will be actuated by the other, and means for automatically adjusting the connection to vary the stroke of the fuel pump piston rod.

2. In an internal combustion engine, in combination with the working cylinder thereof, a fuel pump adapted to pump fuel into the working cylinder, an air pump adapted to force air into the cylinder, said air pump including a piston rod, the fuel pump also including a piston rod, an operative connection between the two piston rods whereby one will be actuated by the other, and means for adjusting the connection to vary the stroke of the fuel pump piston rod.

3. In an internal combustion engine, and in combination with the working cylinder thereof, an air pump adapted to pump air into the working cylinder, said pump including a reciprocating piston rod, a fuel pump adapted to pump fuel into the working cylinder and also including a reciprocating piston rod, means for reciprocating one of said piston rods, means including a link for operatively connecting said rods, and a shiftable support to which said link is pivotally connected whereby the stroke of one of said rods may be lengthened or shortened.

4. In an internal combustion engine, and in combination with the working cylinder thereof, an air pump adapted to pump air into the cylinder and operatively connected to the crank shaft of the engine, a fuel pump adapted to pump fuel into the working cylinder, the said fuel pump including a piston rod and the air pump also including a piston rod, a slotted link, a pin secured to the first named piston rod and mounted for relative movement in the slot of said link, a shiftable support upon which said link is pivotally mounted whereby the stroke of the first named piston rod may be varied, and an actuating rod pivotally connected to said link and to the second named piston rod.

5. In an internal combustion engine and in combination with the working cylinder thereof, an air pump adapted to pump air into the working cylinder, a fuel pump adapted to pump fuel into the working cylinder, a piston rod working in the fuel pump, a governing mechanism, controlled by the speed of the engine and including a crosshead, a slotted link pivotally connected to the crosshead and operatively connected to said piston rod, the cross head being manipulated by the variations in the speed of the governor, the air pump including a piston rod, means for reciprocating said piston rod, and a pivotal connection between said last named piston rod and the link.

6. In an internal combustion engine and in combination with the working cylinder thereof, means for pumping air and fuel into the working cylinder, such means including a fuel pump, a governor controlled crosshead, a link pivotally connected to said crosshead, said link being formed with a slot, and the fuel pump including a piston rod provided with a cross pin accommodated in said slot, means for rocking said link, the crosshead being provided with an opening, a spring having one end fitted in said opening supported to resist the movement of the cross-head in one direction, and a hand lever adapted to vary the tension on the spring.

7. In an internal combustion engine and in combination with the working cylinder thereof, means for pumping air and fuel into said working cylinder, said means including a fuel pump and a piston rod working therein, a governor controlled movable crosshead, a slotted link pivotally connected to said cross head, means for rocking said link, the piston rod being provided with a crosspin movably mounted in the slot of the link, a spring connected at one end to the crosshead and fulcrumed intermediate of its ends, and a hand lever adapted to bear on the opposite end of said spring to vary the tension of the spring on the crosshead.

8. In an internal combustion engine, and in combination with the working cylinder thereof, means for forcing air and fuel into the working cylinder, said means including a fuel pump and a piston rod working therein, and an air pump and a piston rod working therein, means for automatically varying the stroke of one of the rods relative to the other according to the load imposed on the engine, a hand lever arranged to manually control said means, a spark producing mechanism, and means connecting said hand lever with said mechanism for advancing and retarding the spark.

9. In an internal combustion engine, and in combination with the working cylinder thereof, means for pumping air and fuel into said working cylinder, means for automatically varying the proportions of fuel relative to the air according to the load imposed on the engine, a hand lever arranged to manually control said means, a spark producing bar, a bell crank to which said bar is connected, a link rod connected to the hand lever, a bell crank connected to the link rod and the first named bell crank, means for engaging the first named bell crank to operate the spark producing bar, and a yieldable connection between the second named bell crank and said bar.

10. In an internal combustion engine, and in combination with the working cylinder thereof, means for pumping air and fuel into the working cylinder, such means including a fuel pump, a governor controlled cross head, a supporting guide upon which the crosshead is mounted for movement, a T-shaped link pivotally connected to said cross-head and formed in its shank with a longitudinal slot, the fuel pump including a piston rod provided with a forked end and a pin extending through said end and mounted in said slot, the first named means including an air pump and a piston rod mounted therein, and a pivotal connection between said link and the last named rod.

11. In an internal combustion engine, and in combination with the working cylinder thereof, an air pump adapted to pump air into the working cylinder, a fuel pump adapted to pump fuel into the working cylinder, a piston rod working in the air pump, a piston rod working in the fuel pump, a slotted link operatively connected to both of said piston rods, and an automatically adjustable support to which the link is pivotally connected.

In testimony whereof I affix my signature in presence of two witnesses.

ADOLPH P. GUBRUD. [L. S.]

Witnesses:
T. B. CASSILL,
K. E. JACOBSON.